United States Patent
Hrubec et al.

(10) Patent No.: US 12,018,619 B2
(45) Date of Patent: Jun. 25, 2024

(54) COMPOUND SYMMETRIC GEARBOX FOR A TURBOMACHINE

(71) Applicant: GE Avio S.r.l., Rivalta di Torino (IT)

(72) Inventors: Juraj Hrubec, Prague (CZ); Leonardo Coviello, Rivalta di Torino (IT)

(73) Assignee: GE Avio S.r.l. (IT)

( * ) Notice: Subject to any disclaimer, the term of this patent is extended or adjusted under 35 U.S.C. 154(b) by 0 days.

(21) Appl. No.: 17/972,498

(22) Filed: Oct. 24, 2022

(65) Prior Publication Data

US 2023/0142715 A1    May 11, 2023

(30) Foreign Application Priority Data

Nov. 5, 2021  (IT) .......................... 102021000028244

(51) Int. Cl.
*F02C 7/36*  (2006.01)
*F16H 57/08*  (2006.01)

(52) U.S. Cl.
CPC .............. *F02C 7/36* (2013.01); *F16H 57/082* (2013.01); *F05D 2220/323* (2013.01); *F05D 2260/40311* (2013.01)

(58) Field of Classification Search
CPC .......... F02C 7/36; F16H 57/082; F16H 55/17; F16H 2001/2881; F16H 2001/289; F16H 1/28; F16H 1/32; F16H 57/023; F16H 57/08; F16H 2001/327; F16H 2057/02039; F05D 2220/323; F05D 2260/40311; F02K 3/06

USPC ........................................................ 415/122.1
See application file for complete search history.

(56) References Cited

U.S. PATENT DOCUMENTS

| | | | |
|---|---|---|---|
| 8,096,917 B2 | 1/2012 | Benito | |
| 8,172,717 B2 | 5/2012 | Lopez et al. | |
| 8,517,672 B2 | 8/2013 | McCooey | |
| 8,777,802 B2 | 7/2014 | Erno et al. | |
| 9,702,451 B2 | 7/2017 | Gravina | |
| 2007/0087892 A1* | 4/2007 | Orlando | F02K 3/072 475/348 |
| 2017/0227115 A1 | 8/2017 | Smook et al. | |
| 2018/0080411 A1* | 3/2018 | Miller | F02C 3/107 |
| 2019/0390737 A1 | 12/2019 | Smook | |
| 2020/0025278 A1 | 1/2020 | Lundbäck | |

FOREIGN PATENT DOCUMENTS

| | | | |
|---|---|---|---|
| EP | 2836694 B1 | 6/2016 | |
| EP | 3361122 A1 | 8/2018 | |
| EP | 3767131 A1 | 1/2021 | |
| GB | 2351121 A * | 12/2000 | ............... F16H 1/28 |

* cited by examiner

*Primary Examiner* — J. Todd Newton
(74) *Attorney, Agent, or Firm* — Klarquist Sparkman, LLP (57) ABSTRACT

A gear assembly for use with a turbomachine engine comprises a sun gear, a plurality of planet gears, and a ring gear. The gear assembly is connected to an input shaft and an output shaft. The sun gear is configured to rotate about a longitudinal centerline of the gear assembly and is driven by the input shaft. A component of the gear assembly drives the output shaft. The planet gears can be compound planet gears having a first stage and a second stage.

14 Claims, 8 Drawing Sheets

COMPOUND SYMMETRIC GEARBOX FOR A TURBOMACHINE

CROSS-REFERENCE TO RELATED APPLICATION

This application claims the benefit of Italian Patent Application No. 102021000028244 filed on Nov. 5, 2021, which is incorporated by reference herein in its entirety.

FIELD

The present subject matter relates generally to turbomachines including gear assemblies and, in particular, to compound gear assembly arrangements for achieving low gear ratios.

BACKGROUND

Gas turbine engines employ gear assemblies to convert core engine output into useful turbofan work. However, the size, efficiency, and minimum gear ratio of these gear assemblies is limited by the mechanical demands on the individual gears. Additionally, these gear assemblies may have complex designs with a high part count. Accordingly, there is a need for improvements in gear assembly design to achieve low gear ratios with smaller assembly size, lower complexity, and greater efficiency.

BRIEF DESCRIPTION OF THE DRAWINGS

A full and enabling disclosure of the preferred embodiments directed to one of ordinary skill in the art, is set forth in the specification, which makes reference to the appended figures, in which.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the preferred embodiments without departing from the scope or spirit of the disclosure. For instance, features illustrated or described as part of one embodiment can be used with another embodiment to yield a still further embodiment. Thus, it is intended that the preferred embodiments cover such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Disclosed herein are various embodiments of gear assemblies, particularly multistage epicyclic gear assemblies having low gear ratios. The gear assemblies disclosed herein can include a first stage gear and a second stage gear. The first stage gear increases the rotational speed of the planet gears and gear assembly layshafts relative to the rotational speed of the input shaft. The second stage gear drives a ring gear at a rotational speed lower than that of the planet gears. Gear assemblies disclosed herein offer several advantages when compared to conventional gear assemblies.

For example, in engines having a ducted engine architecture with counter-rotating vaneless turbines, a low gear ratio between the sun gear and the ring gear of an epicyclic gear assembly (i.e., a gear ratio of 3.5 or less) is desirable. In a conventional single-stage epicyclic gearbox, this is typically achieved using a large sun gear and relatively small planet gears. However, when smaller planet gears are used, the use of more planet gears is generally required. This can pose challenges with bearing design. In particular, smaller planet gears leave less radial space for the roller bearings which support the planet gears, as the radial profile of each component of the planet gears may need to be reduced with the reduction in overall planet gear radial size. This causes an exponential reduction in the load-bearing capacity of the bearings as the bearing size decreases.

Furthermore, the need for a greater number of planet gears increases the part count of an engine. A high part count contributes to a higher production and maintenance cost of an engine, and may increase the time required to maintain and repair an engine.

Additionally, in a conventional gear assembly, the minimum size of the planet gears may be limited by the minimum allowable load sharing factor (sometimes called the "LSF"). Ideally, equally sized planet gears should bear equal portions of the operational torque of an epicyclic gear assembly, such that in a system with n gears, each gear bears 1/n of the operational torque. However, due to variations in part tolerance and deflections experienced by the engine during operation, each planet gear of the epicyclic gear assembly may end up bearing a varying share of the torque. Accordingly, the planet gears may need to be oversized to withstand a torque load greater than 1/n, as may occur due to engine component deflection or variances in part tolerance. When overall planet gear size is reduced, each gear may need to be designed with a relatively greater fraction of mechanical tolerance to accommodate the LSF. In practice, this imposes a limit on how small planet gears may become in a conventional epicyclic gear assembly, and may require an epicyclic gear assembly with a larger radial footprint.

The gear assemblies disclosed herein address these challenges, and offer several important advantages. Because the gear assemblies disclosed herein can utilize a smaller input shaft, the gear assemblies can either reduce the size of the external ring gear, allowing engines to be designed with a smaller radial profile, larger planet gears, or a combination thereof. When larger planet gears are used, more space is available for large, stable bearings capable of withstanding large loads. Additionally, the planet gears themselves can be more robustly designed with a lower load sharing factor to improve the overall durability and expected life cycle of the gearbox. When gear assemblies are designed with a smaller radial profile (i.e., a smaller ring gear), they may also have considerably less weight, further improving aircraft efficiency.

Furthermore, the use of a smaller number of comparatively larger planet gears also results in a decreased part count compared to a conventional epicyclic gear assembly. A lower part count can, in turn, result in a decrease in the cost and complexity of engine maintenance, and a reduction in the amount of time required to maintain or overhaul a damaged or worn engine.

The linear velocity of the gear teeth, known as the pitch line velocity (PLV), of the planet and ring gears of the gear assemblies disclosed herein can also be lower than that exhibited in a conventional gear assembly. Additionally, a high pitch line velocity can cause increased energy losses, which reduce engine efficiency. Accordingly, the gear assemblies disclosed herein can exhibit reduced maintenance requirements and improve efficiency by decreasing pitch line velocity.

The gear assembly examples disclosed herein may also allow the use of bi-helical gears that may difficult or impossible to use in a conventional gear design, because bi-helical gears are axially locked (i.e., unable to move axially relative to one another) and in a conventional gear assembly, may be incapable of accommodating operational expansions and contractions of the engine shaft. Helical gears offer several advantages over conventional spur gears. Angled teeth engage more gradually than do spur gears, allowing for smoother operation and reduced wear. Additionally, more teeth are in contact at any given time for a helical gear than for a spur gear, allowing for a more even distribution of forces. Additionally, the angled placement of the teeth of a helical gear ensures that more surface area is in contact at any given time than would be the case for a spur gear. Accordingly, a gear assembly using helical gears can withstand higher loads, and will last longer before it must be repaired or replaced than a gear assembly using spur gears.

Thus, utilizing the gear assembly designs disclosed herein, it is easier to achieve low gear ratios, such as gear ratios below 2.3 without sacrificing engine performance and reliability, and without adding undue complexity to the engine design.

Figure 1:
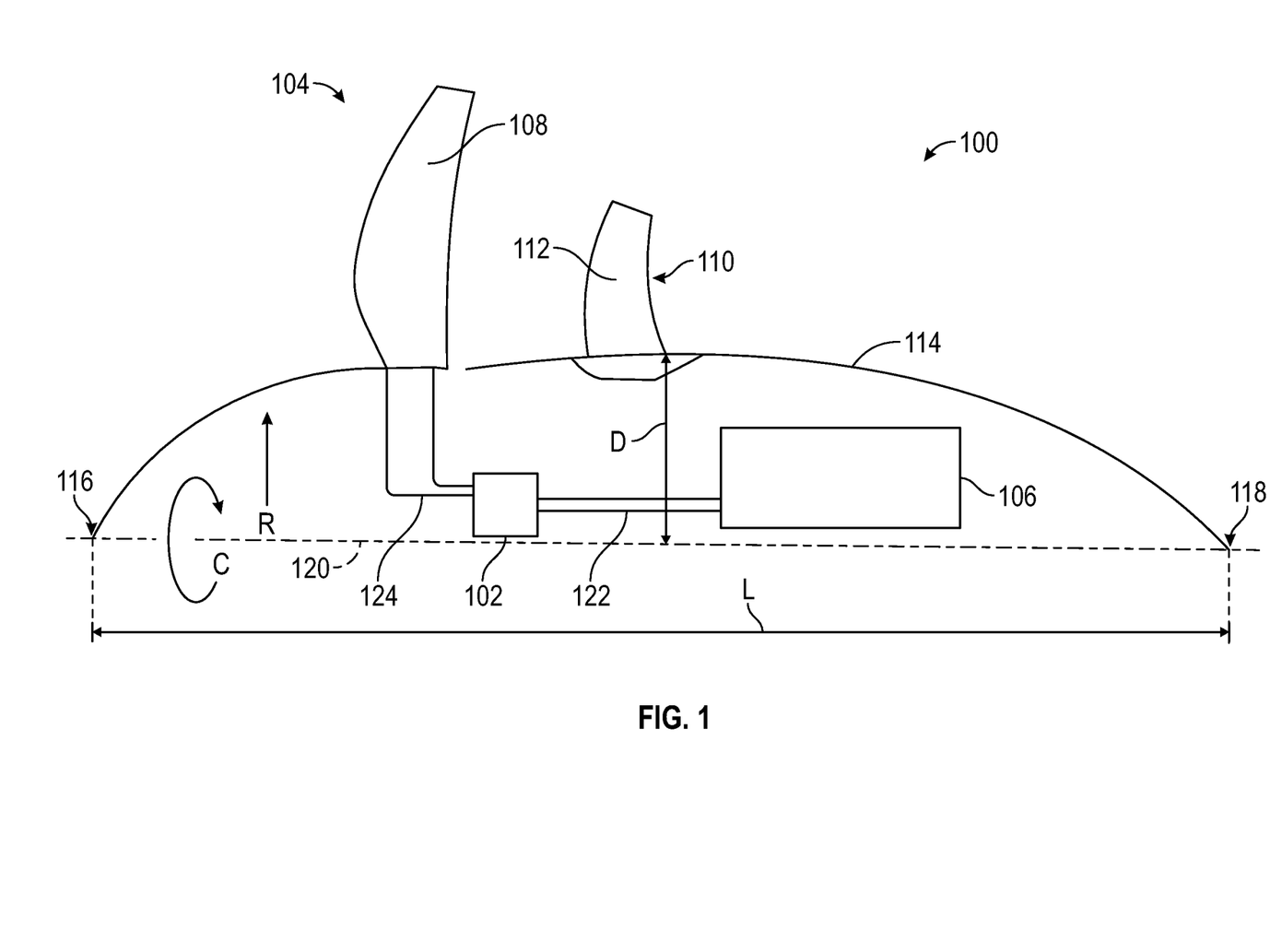
FIG. 1 is a cross-sectional schematic illustration of an exemplary embodiment of an open rotor propulsion system.

Referring now to the drawings, FIG. 1 is an exemplary embodiment of an engine 100 including a gear assembly 102 according to aspects of the present disclosure. The engine 100 includes a fan assembly 104 driven by a core engine 106. In various embodiments, the core engine 106 is a Brayton cycle system configured to drive the fan assembly 104. The core engine 106 is shrouded, at least in part, by an outer casing 114. The fan assembly 104 includes a plurality of fan blades 108.

In some embodiments, a vane assembly 110 is extended from the outer casing 114. The vane assembly 110 including a plurality of vanes 112 is positioned in operable arrangement with the fan blades 108 to provide thrust, control thrust vector, abate or re-direct undesired acoustic noise, and/or otherwise desirably alter a flow of air relative to the fan blades 108. In some embodiments, the fan assembly 104 includes between three (3) and twenty (20) fan blades 108. In particular embodiments, the fan assembly 104 includes between ten (10) and sixteen (16) fan blades 108. In certain embodiments, the fan assembly 104 includes twelve (12) fan blades 108. In certain embodiments, the vane assembly 110 includes an equal or fewer quantity of vanes 112 to fan blades 108.

In certain embodiments, such as depicted in FIG. 1, the vane assembly 110 is positioned downstream or aft of the fan assembly 104. However, it should be appreciated that in some embodiments, the vane assembly 110 may be positioned upstream or forward of the fan assembly 104. In still various embodiments, the engine 100 may include a first vane assembly positioned forward of the fan assembly 104 and a second vane assembly positioned aft of the fan assembly 104. The fan assembly 104 may be configured to desirably adjust pitch at one or more fan blades 108, such as to control thrust vector, abate or re-direct noise, and/or alter thrust output. The vane assembly 110 may be configured to desirably adjust pitch at one or more vanes 112, such as to control thrust vector, abate or re-direct noise, and/or alter thrust output. Pitch control mechanisms at one or both of the fan assembly 104 or the vane assembly 110 may co-operate to produce one or more desired effects described above.

The core engine 106 is generally encased in outer casing 114 defining a maximum diameter. In certain embodiments, the engine 100 includes a length from a longitudinally forward end 116 to a longitudinally aft end 118. In various embodiments, the engine 100 defines a ratio of length (L) to maximum diameter (Dmax) that provides for reduced installed drag. In one embodiment, L/Dmax is at least 2. In another embodiment, L/Dmax is at least 2.5. In some embodiments, the L/Dmax is less than 5, less than 4, and less than 3. In various embodiments, it should be appreciated that the L/Dmax is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the L/Dmax, the fan assembly 104, and/or the vane assembly 110 separately or together configure, at least in part, the engine 100 to operate at a maximum cruise altitude operating speed between approximately Mach 0.55 and approximately Mach 0.85.

Referring again to FIG. 1, the core engine 106 extends in a radial direction R relative to an engine axis centerline 120. The gear assembly 102 receives power or torque from the core engine 106 through a power input source 122 and provides power or torque to drive the fan assembly 104, in a circumferential direction C about the engine axis centerline 120, through a power output source 124.

In certain embodiments, such as depicted in FIG. 1, the engine 100 is an un-ducted thrust producing system, such that the plurality of fan blades 108 is unshrouded by a nacelle or fan casing. As such, in various embodiments, the engine 100 may be configured as an unshrouded turbofan engine, an open rotor engine, or a propfan engine. In particular embodiments, the engine 100 is a single unducted rotor engine including a single row of fan blades 108. The engine 100 configured as an open rotor engine includes the fan assembly 104 having large-diameter fan blades 108, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally higher cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft. and approximately 45,000 ft.

Although depicted above as an unshrouded or open rotor engine in FIG. 1, it should be appreciated that the gear assemblies disclosed herein may be applied to shrouded or ducted engines, partially ducted engines, aft-fan engines, vaneless contra-rotating turban (VCRT) engines, or other turbomachine configurations, including those for marine, industrial, or aero-propulsion systems. In addition, the gear assemblies disclosed herein may also be applicable to turbofan, turboprop, or turboshaft engines.

Figure 2:
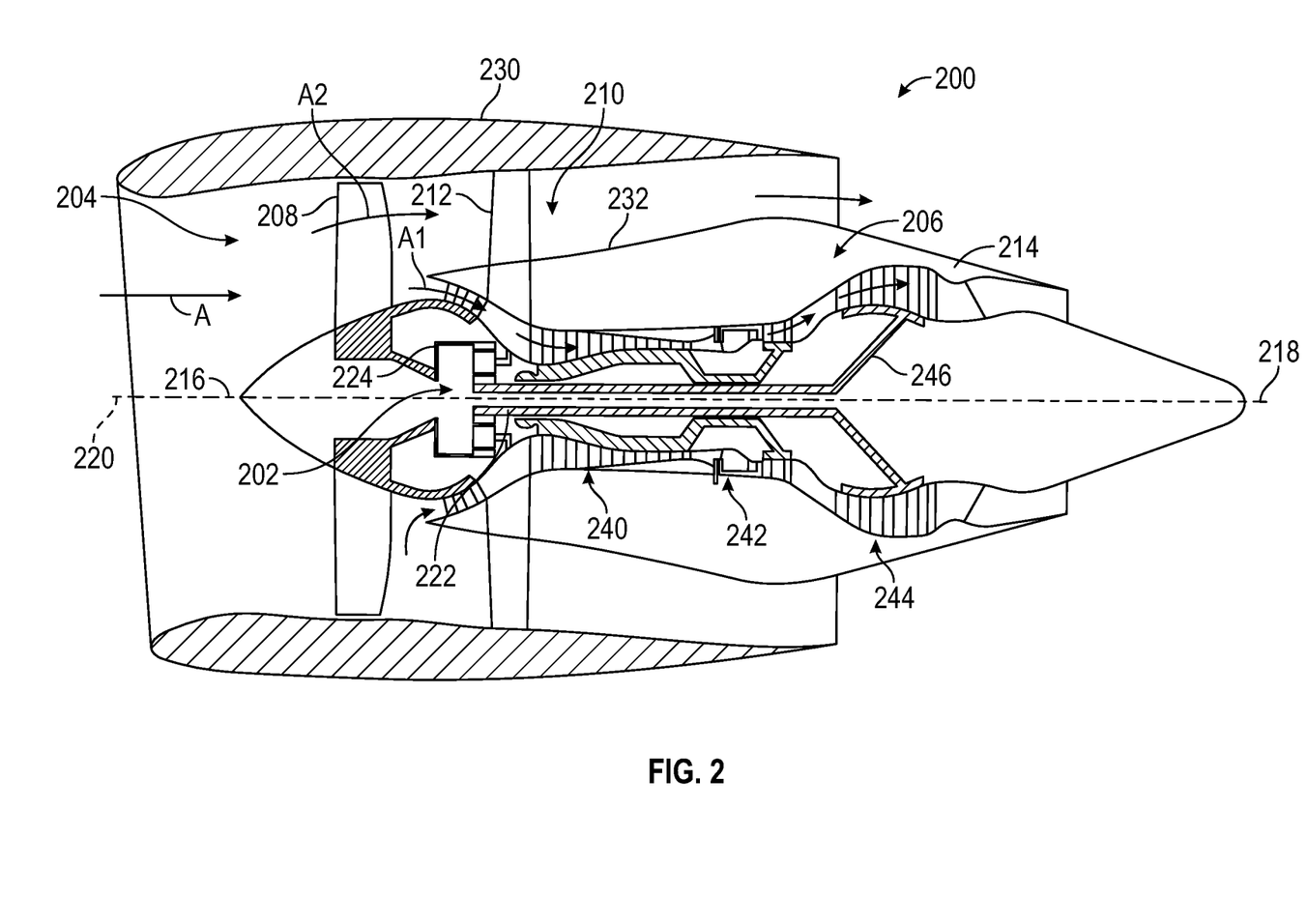
FIG. 2 is a cross-sectional schematic illustration of an exemplary embodiment of a ducted propulsion system.

For example, FIG. 2 is a cross-sectional schematic illustration of an exemplary embodiment of an engine 200 that includes a gear assembly 202 in combination with a ducted fan propulsion system. However, unlike the open rotor configuration of FIG. 1, a fan assembly 204 and its fan blades 208 are contained within an annular fan case 230 and a vane assembly 210 and one or more vanes 212 extend radially between a fan cowl 232 and the inner surface of the fan case 230. As discussed above, the gear assemblies disclosed herein can provide for increased gear ratios for a fixed gear envelope (e.g., with the same size ring gear), or alternatively, a smaller diameter ring gear may be used to achieve the same gear ratios.

s shown in FIG. 2, a core engine 206 is generally encased in an outer casing 214, and has a length extending from a longitudinally forward end 216 to a longitudinally aft end 218. The exemplary core engine (for a ducted or unducted engine) can include a compressor section 240, a heat addition system 242 (e.g., combustor), and an expansion section 244 together in serial flow arrangement. The core engine 206 extends circumferentially relative to an engine centerline axis 220. The core engine 206 includes a high-speed spool that includes a high-speed compressor and a high-speed turbine operably rotatably coupled together by a high-speed shaft 246 is also operably connected to gear assembly 202 to provide power to the fan assembly 204 via a power input source 222, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low-speed turbine" defines a component configured to operate at a rotational speed, such as a maximum allowable rotational speed, lower than a "high turbine" or "high-speed turbine" at the engine. Alternatively, unless otherwise specified, the aforementioned terms may be understood in their superlative degree. For example, a "low turbine" or "low-speed turbine" may refer to the lowest maximum rotational speed turbine within a turbine section, a "low compressor" or "low speed compressor" may refer to the lowest maximum rotational speed turbine within a compressor section, a "high turbine" or "high-speed turbine" may refer to the highest maximum rotational speed turbine within the turbine section, and a "high compressor" or "high-speed compressor" may refer to the highest maximum rotational speed compressor within the compressor section. Similarly, the low-speed spool refers to a lower maximum rotational speed than the high-speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

As discussed in more detail below, the core engine includes the gear assembly that is configured to transfer power from the expansion section and reduce an output rotational speed at the fan assembly relative to a low-speed turbine. Embodiments of the gear assemblies depicted and described herein can allow for gear ratios suitable for large-diameter unducted fans (e.g., FIG. 1) or certain turbofans (e.g., FIG. 2). Additionally, embodiments of the gear assemblies provided herein may be suitable within the radial or diametrical constraints of the core engine within the outer casing.

Figure 3:
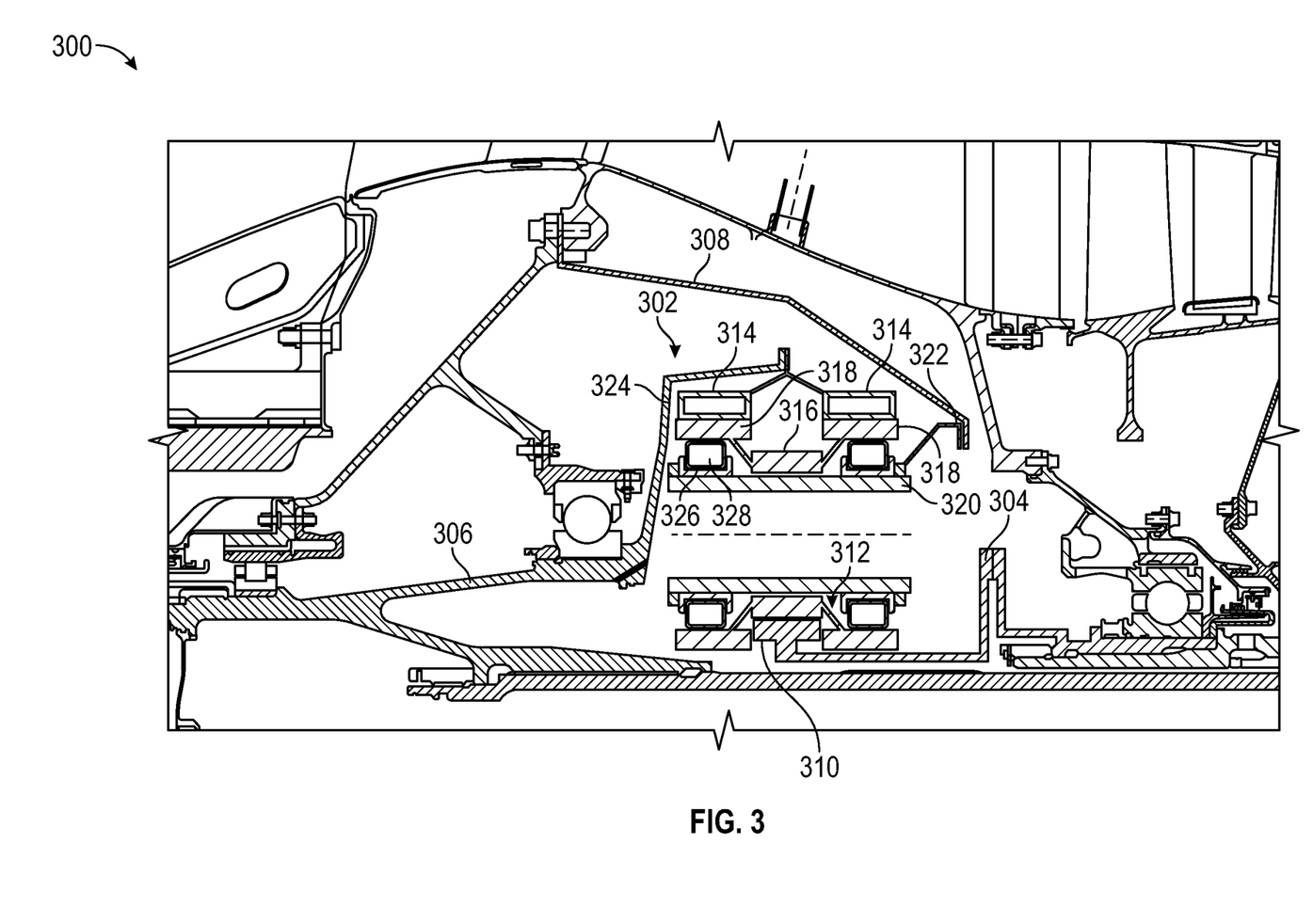
FIG. 3 is a cross-sectional schematic illustration of an exemplary embodiment of a turbofan engine including a partial gear assembly according to one example.

FIG. 3 shows an example engine 300 with a gear assembly 302 according to the examples disclosed herein. The engine 300 also comprises an input shaft 304, an output shaft 306, and a fixed engine housing 308. The gear assembly 302 is configured to receive the input shaft 304 and to drive the output shaft 306. The gear assembly 302 can additionally be attached to fixed engine housing to hold one or more components of the gear assembly 302 stationary relative to the fixed engine housing.

The input shaft 304 can extend from a core engine of engine 300 to the gear assembly 302, to supply rotational power to the gear assembly. The gear assembly 302 can drive the output shaft 306, which in turn can drive a fan assembly. The gear assembly 302 can include a gear set for decreasing the rotational speed of the fan assembly relative to the low speed (pressure) turbine. In operation, the rotating fan blades of the fan assembly are driven by the low speed (pressure) turbine via gear assembly such that the fan blades rotate around the engine axis centerline and generate thrust to propel the engine, and hence an aircraft on which it is mounted, in the forward direction.

The following are exemplary compound multi-stage gear assemblies that can provide lower gear ratios in fewer gear stages, and which can do so in a smaller radial footprint, when compared to conventional single-stage gear assemblies. The compound multi-stage gear assemblies disclosed herein can typically include a first stage gear and a second stage gear.

Figure 4:
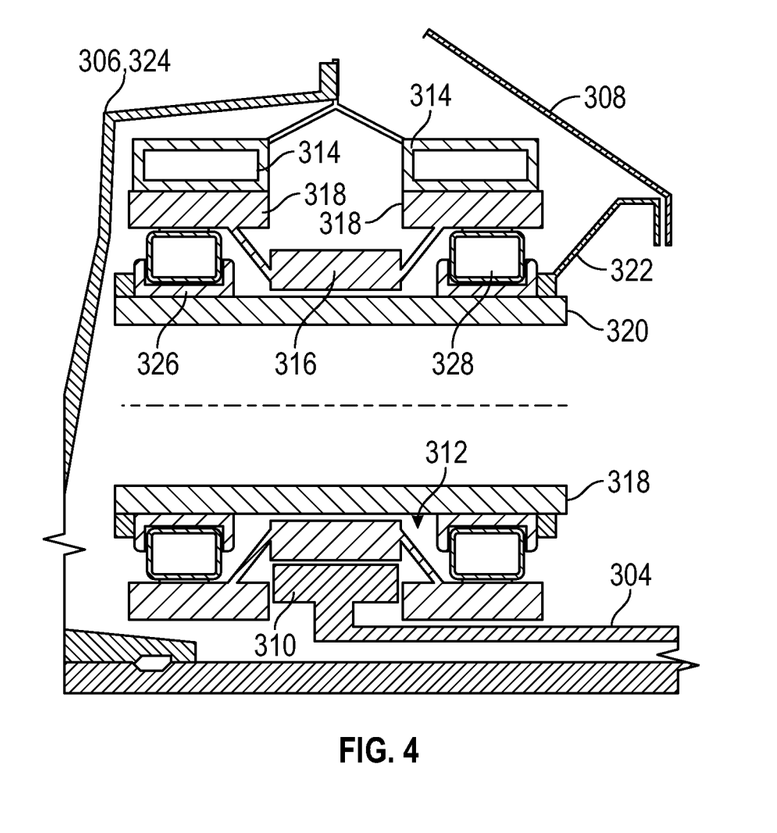
FIG. 4 is a detailed cross-sectional schematic illustration of the partial gear assembly of FIG. 3.

FIGS. 3 and 4 show one example compound multi-stage gear assembly 302 according to the present disclosure. The gear assembly 302 can comprise a sun gear 310, a plurality of compound planet gears 312 (sometimes called lay shafts), and a ring gear 314. The compound planet gears 312 can be disposed radially outwards from and engaged with the sun gear 310. The ring gear 314 can be disposed radially outwards of and engaged with the compound planet gears 312.

Figure 8:
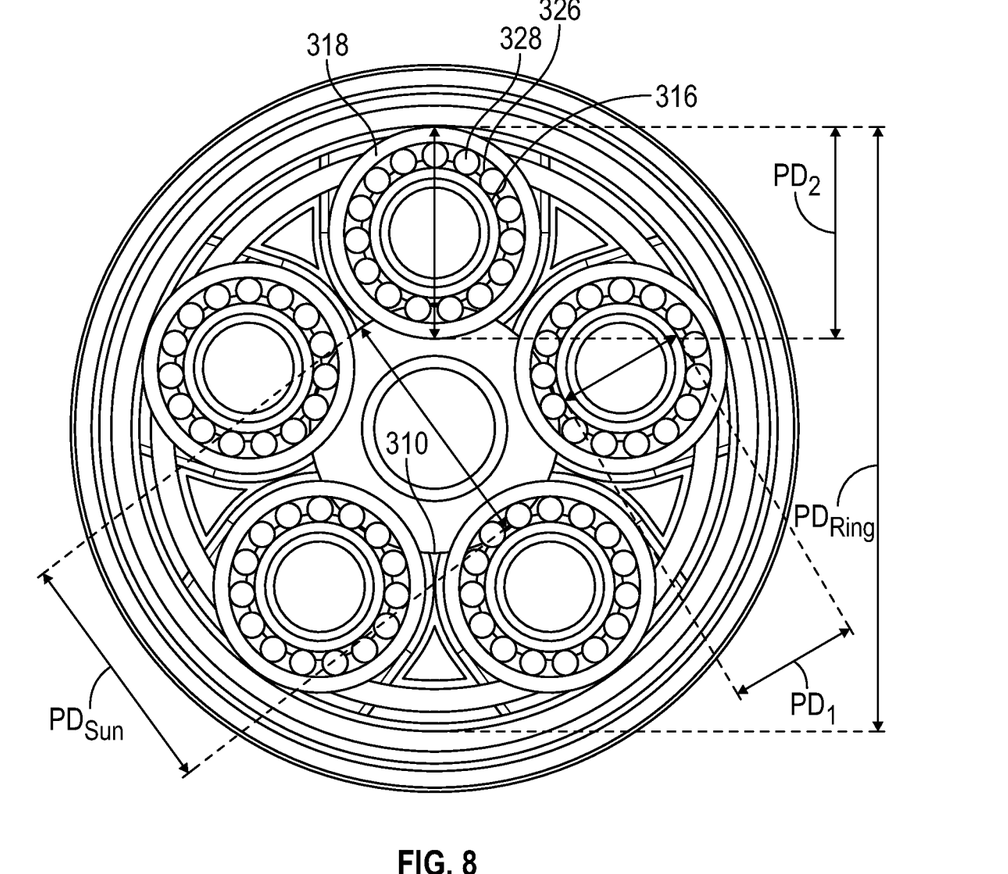
FIG. 8 is a radial cross-sectional view of a full gear assembly according to the example of FIG. 7

The sun gear 310 can be connected to and driven by the input shaft 304. The sun gear 310 can, in some examples, be integrally formed with the input shaft 304. In other examples, the sun gear 310 can be formed separately from the input shaft 304 and fixedly attached thereto. The sun gear 310, as shown in FIG. 8, can have a sun gear pitch diameter, $PD_{sun}$. The sun gear pitch diameter, $PD_{sun}$ is the defined as the circle described by an imaginary line drawn through the midpoint of each gear tooth on the sun gear 310.

Figure 5:
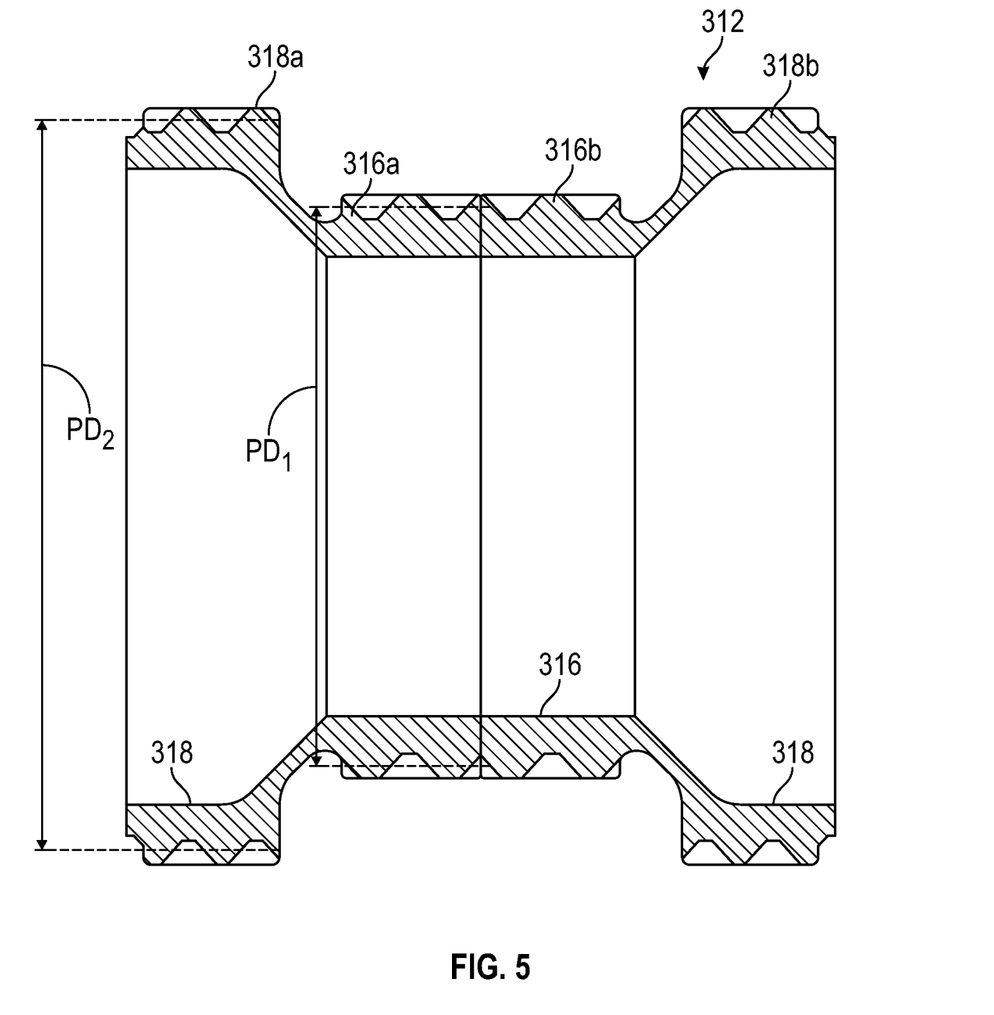
FIG. 5 is a cross-sectional schematic illustration of a compound planet gear according to one example.

The planet gears 312 can comprise a first stage gear 316 and a second stage gear 318. The first stage gear 316 (sometimes referred to as a multiplicator gear) of each planet gear 312 can be configured to engage with the sun gear 310. The second stage gear 318 of each planet gear 312 (sometimes referred to as a reductor gear) can be configured to engage the ring gear 314. The first stage gear 316 and the second stage gear 318 of each compound planet gear can be joined such that the first and second stage gears 316, 318 have an identical rotational speed. In some examples, the first stage gear 316 and the second stage gear 318 of the planet gears 312 can be integrally formed. In other examples, however, the first stage gear 316 and the second stage gear 318 of the planet gears 312 can be separately formed and then affixed to each other. As illustrated in FIGS. 5 and 8, The first stage gear 316 of the planet gear 312 can have a first stage pitch diameter, $PD_1$. The first stage pitch diameter $PD_1$ is defined as the circle described by an imaginary line drawn through the midpoint of each gear tooth on the first stage gear 316 of the compound planet gear 312. With continued reference to FIGS. 5 and 8, the second stage gear 318 of the planet gear 312 has a second stage pitch diameter, $PD_2$. The second stage pitch diameter $PD_2$ is defined as the circle described by an imaginary line drawn through the midpoint of each gear tooth on the second stage gear 318 of the compound planet gear 312.

Figure 6:
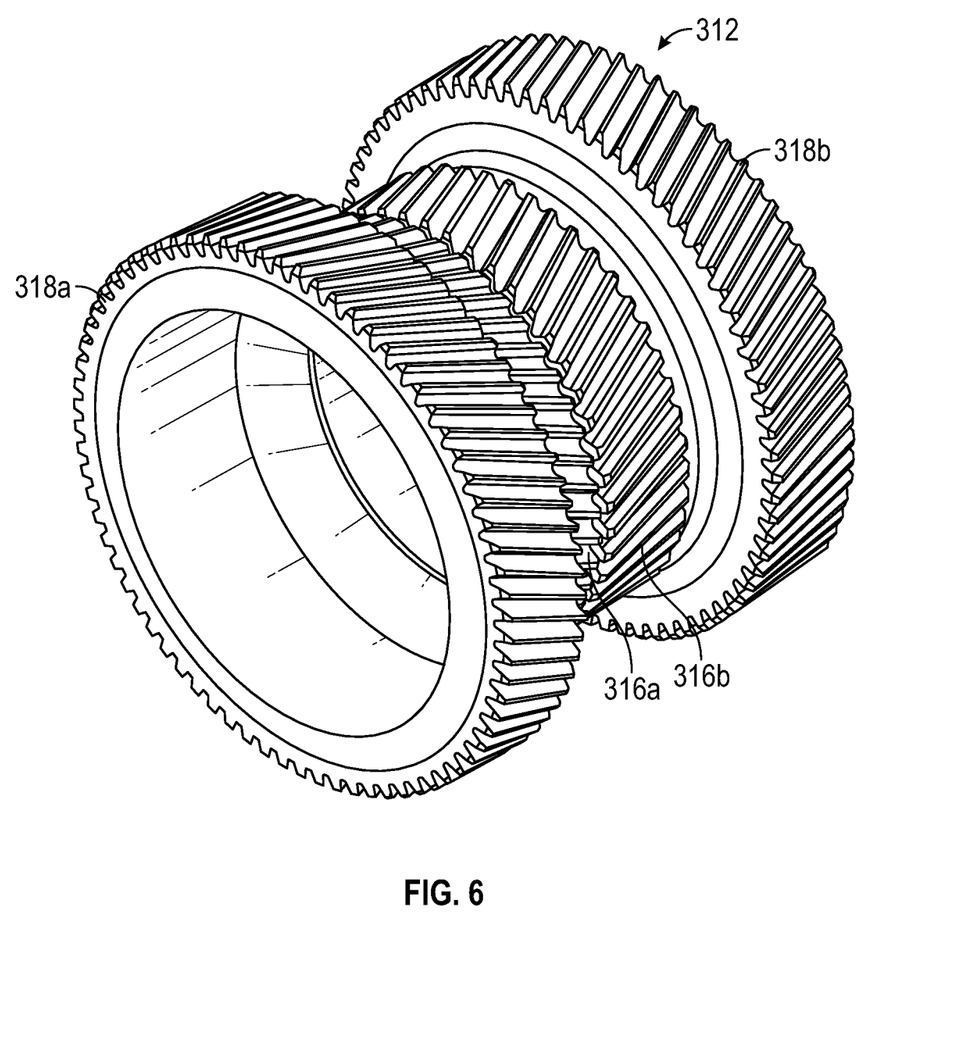
FIG. 6 is a perspective view of the compound planet gear of FIG. 5.

In some examples, such as those illustrated in FIGS. 5-6, the second stage gear 318 of each compound planet gear 312 can include a first second stage gear 318a and a second stage gear 318b. The first second stage gear 318a and the second second stage gear 318b can be disposed to either side of the first stage of the planet gear 312, as best shown in FIGS. 5 and 6. In such examples, the first second stage gear 318a and second second stage gear 318b can form opposite axial ends of the compound planet gears 312.

In some examples, such as that illustrated in FIGS. 5-6, the first stage gear 316 of each compound planet gear 312 can include a first first stage gear 316a and a second first stage gear 316b. The first and second first stage gears 316a, 316b can be disposed inwards from the first and second first stage gears 318a and 318b of the second stage compound planet gears, such that the first and second first stage gears 316a, 316b are disposed towards the axial center of the compound planet gear 312 and the first and second second stage gears 318a, 318b are disposed towards the axial ends of the compound planet gear 312. It is to be understood, however, that in other examples, other configurations are possible. For instance, the first stage gear 316 and the second stage gear 318 of each compound planet gear 312 could compose a first first stage gear and a first second stage gear respectively. In such a configuration, the first stage gear may be forward relative to the second stage gear or aft relative to the second stage gear. Alternatively, the first stage gear 316 of the compound planet gears could comprise a single first stage gear, and the second stage gear 318 could comprise two or more second stage gears disposed towards the axial ends of the compound planet gear 312, and the first stage gear 316 disposed towards the axial center of the compound planet gear 312.

The compound gear assembly 302 can further include the ring gear 314. The ring gear 314 can be configured to engage with the second stage gear 318 of the compound planet gear 312. The ring gear 314 can also be attached to a gear assembly output, such as a fan shaft 324. As illustrated in FIGS. 3 and 4, the ring gear can be detached from the fixed engine housing 308 of the engine 300. The ring gear 314 has an inner diameter that defines the interior space of the gear assembly 302 into which the other gear components (e.g., the input shaft 304, the sun gear 310, the compound planet gears 312 and their respective subcomponents) will fit. The ring gear 314 has a ring gear pitch diameter, $PD_r$. The ring gear pitch diameter, $PD_r$, is the circle defined by an imaginary line drawn through the midpoint of each gear tooth on the ring gear 314.

Returning to FIG. 4, the compound planet gears 312 can, in some examples, have a layshaft pin 320 extending axially therethrough. The layshaft pin 320 can, in some examples, be attached to a planet gear carrier 322. The planet gear carrier 322 can, in turn, be attached to the fixed engine housing 308. This attachment of the planet gear carrier 322 to the fixed engine housing 308 can hold the compound planet gears 312 in place relative to the fixed engine housing 308. In such a configuration, the rotation of the compound planet gears 312 within the stationary planet gear carrier 322 causes the rotational movement of the ring gear 314. In turn, the ring gear 314 can be attached to and configured to drive an output element, such as the fan shaft 324. This gear assembly configuration, with the planet gear carrier 322 stationary and the ring gear 314 rotating is sometimes known as a star arrangement or star configuration. In other examples, the planet gear carrier 322 can be detached from the fixed engine housing 308 and the ring gear 314 can be attached to the fixed engine housing 308, immobilizing the ring gear 314 relative to the fixed engine housing 308. This gear assembly configuration, with the ring gear 314 stationary and the planet gear carrier 322 and planet gears 312 rotating is sometimes known as a planet arrangement or planet configuration.

Figure 7:
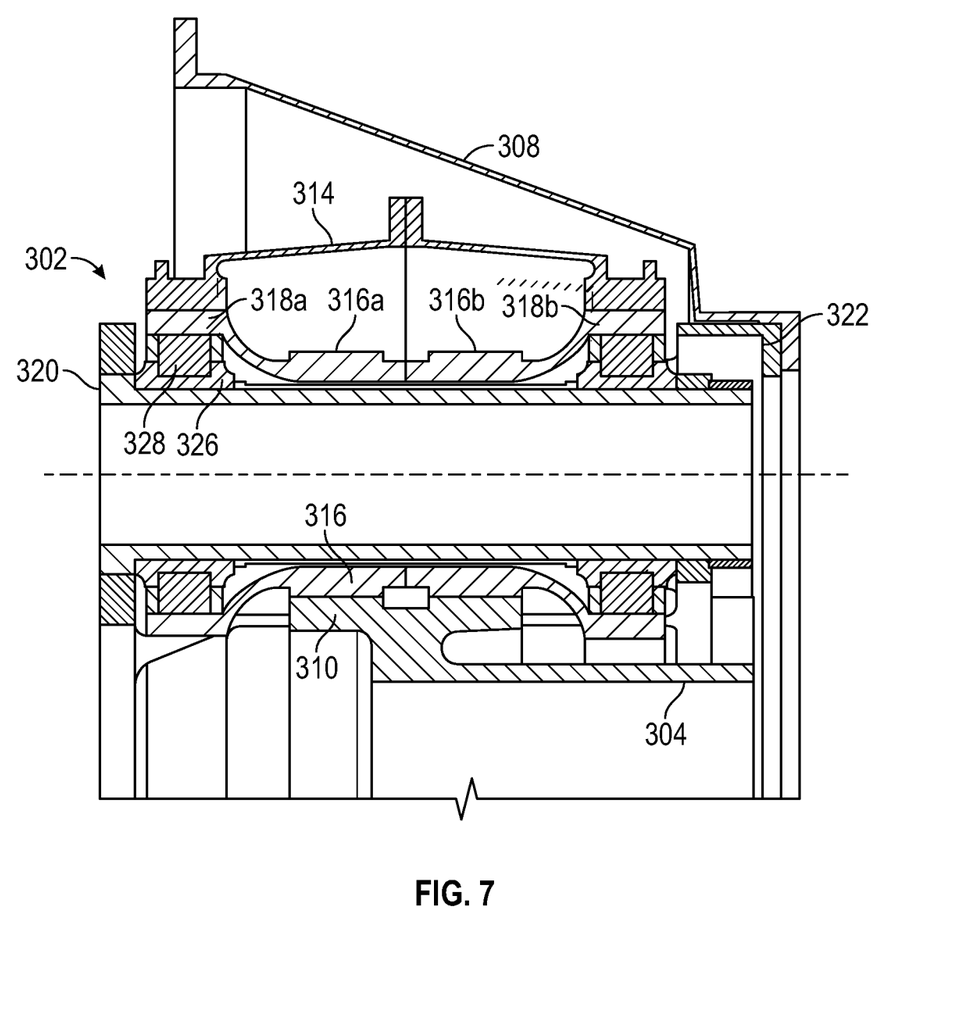
FIG. 7 is a lateral cross-sectional view of a partial gear assembly according to one example.

Turning now to FIG. 7, each compound planet gear 312 can include one or more bearing races 326. The bearing races 326 can be disposed along the outer diameter of the layshaft pin 320 and between the layshaft pin 320 and the second stage gear 318 of the compound planet gear 312. In some examples, such as those shown in FIGS. 7 and 8, the compound planet gear 312 can further include a plurality of bearings 328. As illustrated in FIG. 8, the plurality bearings 328 can be disposed inside the bearing races 326, and simultaneously in contact with both the bearing race 326 and an interior surface of the second stage gear 318 of the compound planet gear 312.

As best illustrated in FIG. 8, the plurality of bearings 328 within any bearing race 326 can form a ring of bearings 328 between the bearing race 326 and the second stage (i.e., reductor) gears 318 of the compound planet gear 312. This ring of bearings 328 can support the second stage (i.e., reductor) gears 318 of the compound gear assemblies against compressive forces, ensure stable rotational motion of the compound gear assemblies relative to the layshaft pins 320 and the ring gear 314, and balance the loading of the compound planet gear 312 during engine operation.

In some examples, such as those illustrated in FIGS. 4 and 7, the sun gear 310 can engage the first stage gear 316 of each of the plurality of compound planet gears 312. In the example illustrated in FIG. 8, the pitch diameter ($PD_{sun}$) of the sun gear 310 can be greater than the pitch diameter ($PD_1$) of the first stage gear 316 of the compound planet gear 312. In this way, the gear ratio between the sun gear 310 and the first stage 316 of the compound planet gear 312 can be less than 1. Accordingly, the rotational speed of the planet gears 312 can be greater than the rotational speed of the sun gear 310 and the input shaft 304.

The second stage gear 318 of the planet gear 312 can, in some examples, rotate at the same rotational speed as the first stage gear 316 of the planet gear 312. The second stage gear 318 of the planet gear 312 can engage with the ring gear 314. In the example illustrated in FIG. 5, the pitch diameter ($PD_2$) of the second stage gear 318 of the compound planet gear 312 can be greater than the pitch diameter ($PD_1$) of the first stage gear 316 of the compound planet gear 312, and less than the pitch diameter ($PD_r$) of the ring gear 314. Accordingly, the rotational speed of the ring gear 314 can be less than the rotational speed of the planet gears 312.

Returning to FIG. 3, the ring gear 314 can be coupled to the fan shaft 324 to drive the fans of an engine, such as engine 300. The sun gear 310 can be coupled to an input power source (e.g., input shaft 304). In some embodiments, the input shaft 304 can be integrally formed with the sun gear 310. The second stage gear 318 of planet gears 312 can be supported by two rows of cylindrical roller bearings 328 at the planet bore. In addition, the fan drive shaft 324 can be supported by tapered or angular roller bearings, which support the fan drive shaft 324 in an axially compact manner. In some embodiments, the tapered or angular roller bearings can be formed from a ceramic material. In some embodiments, the tapered or angular roller bearings can be lubricated by under-race lubrication, in which lubrication is directed under the inner race and forced out through a plurality of holes in an inner race. In some embodiments, as shown in FIG. 3, an inner supporting element of both sets of the roller bearings 328 can be a solid element.

In some embodiments having a more than one first stage gear 316 and/or more than one second stage gear 318, one of the first stage gears and/or second stage gears (e.g., one of the first and second gear sets, one of the third or fourth gear sets) can be angularly clocked by a set amount of gear pitch relative to the other gear set. For example, the teeth of the first gear set can be angularly clocked by a first amount of the gear pitch relative to the teeth of the second gear set. The first amount can be between one fourth and one half. Similarly, the teeth of the third gear set can be angularly clocked by a second amount of the gear pitch relative to the teeth of the fourth gear set. The second amount can be between one fourth and one half.

As previously discussed, the embodiment shown in FIG. 3, depicts the gear assembly 302 in the star configuration in which the planet gear carrier 322 is generally fixed (e.g., static) within the engine by a support structure. The sun gear 310 is driven by an input shaft 304 (e.g., a low-speed shaft). The planet gear carrier 322 is rotatably coupled to the first stage (i.e., multiplicator) gears 316 of the plurality of compound planet gears 312, and the ring gear 314 is configured to rotatably couple with the second stage (i.e., reductor) gears 318 of the plurality of compound planet gears 312, and to rotate about the longitudinal engine axis centerline 220 in a circumferential direction, which in turn drives the power output source (e.g., a fan shaft) that is coupled to and configured to rotate with the ring gear 314 to drive the fan assembly 104, 204. In this embodiment, the low-speed shaft rotates in a circumferential direction that is the opposite of the direction in which the fan shaft rotates.

In other embodiments, the gear assembly 302 can have a planet configuration in which the ring gear 314 is fixed (e.g., static) within the engine 200 by a support structure. The sun gear 310 is driven by an input source (e.g., input shaft 304) and instead of the ring gear 314 rotating, the planet gear carrier 322 rotates in the same direction of the low-speed shaft rotation direction, to drive the output source (e.g., fan shaft 324), and the fan assembly 104, 204.

In some examples, the gear assemblies 302 disclosed herein can include compound planet gears 312, sun gears 310, and ring gears 314 with a helical gear design. FIG. 6, for example, depicts the compound planet gear 312 having a first and second first stage gear 316a, 316b, and a first and second second stage gear 318a, 318b, having a helical design. In conventional gear assemblies having a single stage planet gear, the teeth of the planet gear must be able to mesh with both the teeth of the sun gear and the teeth of the ring gear. In the gear assemblies disclosed herein, each stage of the planet gear engages with one other gear, and it is therefore possible to use a helical gear design. In such examples, the bi-helical meshes of the planet gears axially balance the load over the four (phased) gear sets of each compound planet gear.

In the disclosed gear assemblies, the gear ratio between the sun gear 310 and the first stage gear 316 of the planet gear 312 can be expressed as $GR_1$. $GR_1$ is determined from the ratio of the pitch diameter of the first stage gear 316 of the planet gear 312 ($PD_1$) to the pitch diameter of the sun gear 310 (i.e., $PD_1/PD_{sun}$), and in some examples $GR_1$ can be less than 1. The gear ratio between the second stage gear 318 of the planet gear 312 and the ring gear 314 can be expressed as $GR_2$. $GR_2$ is determined from the ratio of the pitch diameter of the ring gear 314 to the pitch diameter of the second stage gear 318 of the planet gear 312 (i.e, $PD_{ring}/PD_2$), and in some example gear assemblies, $GR_2$ can be greater than $GR_1$ and greater than 1. The total gear ratio, $GR_{Total}$, of the gear assemblies disclosed herein, can be determined from $GR_1$ and $GR_2$ according to the formula $GR_{Total}=GR1\times GR2$. In some examples disclosed herein, $GR_{Total}$ can be less than or equal to 3.5, such as 3.5, 3.3, 3.1, 2.9, 2.7, 2.5, 2.3, 2.1, or 1.9 or any gear ratio in between. In other examples, $GR_{Total}$ can be less than 3.5, less than 3.3, less than 3.1, less than 2.9, less than 2.7, less than 2.5, less than 2.3, less than 2.1, or less than 1.9. Because $GR_1$, in some examples, is less than 1, $GR_2$ can accordingly be greater than $GR_{Total}$ in such examples.

Because the compound gear assembly configuration of the examples described herein allows $GR_2$ to be greater than $GR_{Total}$, the second stage gear 318 of the compound planet gears 312 used in the gear assembly 302 can be larger than the corresponding single stage planet gears of a conventional gear assembly for an equivalent $GR_{Total}$. This in turn allows the gear assemblies disclosed herein to achieve low gear ratios with larger planet gears, or for lower gear ratios to be achieved with planet gears of the same size, when compared to conventional gear assemblies with single stage planet gears.

For the gear assembly examples disclosed herein, the rotational motion of the sun gear 310, the planet gears 312, and the ring gear 314 can, in conjunction with the pitch diameters of those gears, be used to determine the linear speed, or pitch line velocity of the rotating gears. For a gear with a pitch diameter of PD in meters, and a rotational velocity of RV in RPM, the pitch line velocity in meters per second (m/s) can be calculated as: (PD*π*RV)/60.

The pitch line velocity of operational gears governs the speed of engagement experienced by the teeth of rotationally engaging gears, which in turn influences the rate of wear of the teeth of the engaging gears. Furthermore, a high pitch line velocity with more rapid engagement of gear teeth can reduce the operational efficiency of the engine, because a gear assembly with a higher pitch line velocity can generate additional heat. This can require the use of additional lubricant and/or coolant, and the hydraulic interaction between the gears and the lubricant and/or coolant can resist the rotation of the gear assembly and cause mechanical losses. Accordingly, it may be desirable in some example gear assemblies to reduce the pitch line velocity, particularly of the first stage gears of the compound planet gears of the gear assemblies. In some example gear assemblies, this can be achieved by reducing the rotational velocity of the gears. Because the rotational velocity of the planet gears (sometimes called the layshaft speed, or LS) can be determined as a function of the rotational velocity of the input shaft and sun gear, and the ratio of the pitch diameter of the sun gear ($PD_{sun}$) to the pitch diameter of the first stage of the planet gear ($PD_1$) according to the formula: LS=(sun gear input speed*($PD_{sun}/PD_1$)), and because the use of compound planet gears allows for a correspondingly smaller sun gear for any desired gear ratio, the gear assemblies disclosed herein can exhibit lower pitch line velocities for the planet gears compared to a conventional gear assembly.

Furthermore, because the two-stage design of the planet gears 312, in which the second stage gears 318 of the planet gears 312 are larger than the first stage gears 316 of the planet gears 312, allows similar gear ratios to be achieved using a sun gear 310 and input shaft 304 that are smaller relative to the ring gear 314 than would be necessary in a conventional gear assembly design, additional space is available in the radial envelope defined by the ring gear 314 of the gear assembly 302. This allows relatively fewer and larger planet gears 312 to be used than would be possible in a conventional design. Thus, gear assemblies according to the examples disclosed herein can be designed with a lower total part count, and correspondingly lower maintenance needs.

The use of larger planet gears leaves additional space for robust bearing and layshaft pin design. In conventional gear assembly designs, the mechanical demands on the bearings supporting the planet gears provide a practical minimum size below which planet gears may not be reduced. Since increasing the size of the sun gear and decreasing the size of the planet gears is the typical way in which a conventional gear assembly achieves low gear ratio, these mechanical limitations effectively limit the minimum gear ratio that is feasible in a conventional gear assembly. The gear assemblies 302 described herein having a compound planet gear 312 with the first stage gears 316 and the second stage gears 318 can both use smaller sun gears 310 and larger planet gears 312, for reasons previously discussed, and benefit from the inclusion of a reduction stage, allowing the gear assemblies described herein to achieve comparatively lower gear ratios than could be achieved in conventional gear assemblies of similar dimensions.

Moreover, because compound symmetrical gear assembly 302 can use a plurality of compound planet gears 312, and because the first stage gear 316 and the second stage gear 318 of the planet gears 312 engage with one gear (the sun gear 310 and the ring gear 314 respectively), there may be no reverse bending of the planet gears 312 in the gear assembly 302. By contrast, in a conventional gear assembly, the teeth of the planet gears are subject to reverse bending (i.e., the teeth of the planet gears are loaded in one direction by engagement with the sun gear, and loaded in the opposite direction by engagement with the teeth of the ring gear). Because the planet gears 312 of disclosed gear assemblies, such as the gear assembly 302, do not need to be designed to withstand the flexure stress caused by being alternatively loaded in both directions, comparatively smaller gear assemblies may be designed than could be designed using a conventional gearbox configuration, and gear assemblies with a smaller overall radial footprint could be designed for the same target total gear ratio.

As previously discussed, the compound gear assembly examples disclosed herein allow for the use of helical gears. Helical gears afford several design advantages, including decreased part wear, smoother engagement of gear teeth and correspondingly lower energy losses during engine operation, and greater load capacity.

In some specific applications, it is desirable for $GR_{Total}$ to be 2.3 or less. In a conventional epicyclic gearbox, gear ratios of 2.3 or less are usually achievable only when using a high number of planet gears (for example, 8 or more planet gears). In example compound gearboxes disclosed herein, $GR_{Total}$ values of below 2.3 can be achieved using 8 or fewer planet gears, such as 4, 5, 6, 7 or 8 planet gears. Specific gear assembly configurations suitable for achieving a $GR_{Total}$ of 2.3 or less will be discussed in further detail below.

In one illustrative example, a gear assembly may be designed to reduce an input rotational speed of 7000 RPM to an output rotational speed of 3523 RPM. To achieve this reduction, the total gear ratio ($GR_{Total}$) of the exemplary gear assembly should be 1.987. A range of possible gear assembly configurations according to this disclosure is presented in Tables 1 and 2, below.

TABLE 1

Compound Gear Assembly Parameters

| Gear Assembly Design | 1 | 2 | 3 | 4 | 5 | 6 | 7 |
|---|---|---|---|---|---|---|---|
| Ring Gear Output Speed (RPM) | 3523 | 3523 | 3523 | 3523 | 3523 | 3523 | 3523 |
| Sun Gear Input Speed (RPM) | 7000 | 7000 | 7000 | 7000 | 7000 | 7000 | 7000 |

TABLE 1-continued

Compound Gear Assembly Parameters

| Gear Assembly Design | 1 | 2 | 3 | 4 | 5 | 6 | 7 |
|---|---|---|---|---|---|---|---|
| Layshaft Speed (RPM) | 9184 | 9461 | 9747 | 10044 | 10351 | 10670 | 11000 |
| Sun Gear Pitch Diameter (mm) | 160 | 165 | 170 | 175 | 180 | 185 | 190 |
| Ring Gear Pitch Diameter (mm) | 457.4 | 457.4 | 457.4 | 457.4 | 457.4 | 457.4 | 457.4 |
| Total Gear Ratio (GRTotal) | 1.987 | 1.987 | 1.987 | 1.987 | 1.987 | 1.987 | 1.987 |
| Second Stage Pitch Diameter (mm) | 175.5 | 170.4 | 165.3 | 160.5 | 155.7 | 151.1 | 146.5 |
| First Stage Pitch Diameter (mm) | 121.9 | 122.1 | 122.1 | 122 | 121.7 | 121.4 | 120.9 |
| Second Stage Gear Ratio (GR2) | 2.61 | 2.69 | 2.77 | 2.85 | 2.94 | 3.03 | 3.12 |
| First Stage Gear Ratio (GR1) | 0.76 | 0.74 | 0.72 | 0.7 | 0.68 | 0.66 | 0.64 |
| First Stage Pitch Line Velocity (m/s) | 58.6 | 60.5 | 62.3 | 64.1 | 66 | 67.8 | 69.6 |
| Second Stage Pitch Line Velocity (m/s) | 84.4 | 84.4 | 84.4 | 84.4 | 84.4 | 84.4 | 84.4 |
| INPUT shaft Diameter | 106.5 | 116.7 | 126.7 | 136.5 | 146 | 155.3 | 164.4 |
| Number of Lay shafts | 4 | 4 | 4 | 5 | 5 | 5 | 5 |

TABLE 2

Compound Gear Assembly Parameters

| Gear Assembly Design | 8 | 9 | 10 | 11 | 12 | 13 | 14 | 15 |
|---|---|---|---|---|---|---|---|---|
| Ring Gear Output Speed (RPM) | 3523 | 3523 | 3523 | 3523 | 3523 | 3523 | 3523 | 3523 |
| Sun Gear Input Speed (RPM) | 7000 | 7000 | 7000 | 7000 | 7000 | 7000 | 7000 | 7000 |
| Layshaft Speed (RPM) | 11343 | 11699 | 12070 | 12455 | 12856 | 13274 | 13710 | 14166 |
| Sun Gear Pitch Diameter (mm) | 195 | 200 | 205 | 210 | 215 | 220 | 225 | 230 |
| Ring Gear Pitch Diameter (mm) | 457.4 | 457.4 | 457.4 | 457.4 | 457.4 | 457.4 | 457.4 | 457.4 |
| Total Gear Ratio (GRTotal) | 1.987 | 1.987 | 1.987 | 1.987 | 1.987 | 1.987 | 1.987 | 1.987 |
| Second Stage Pitch Diameter (mm) | 142.1 | 137.8 | 133.5 | 129.4 | 125.4 | 121.4 | 117.6 | 113.8 |
| First Stage Pitch Diameter (mm) | 120.3 | 119.7 | 118.9 | 118 | 117.1 | 116 | 114.9 | 113.7 |
| Second Stage Gear Ratio (GR2) | 3.22 | 3.32 | 3.43 | 3.53 | 3.65 | 3.77 | 3.89 | 4.02 |
| First Stage Gear Ratio (GR1) | 0.62 | 0.6 | 0.58 | 0.56 | 0.54 | 0.53 | 0.51 | 0.49 |
| First Stage Pitch Line Velocity (m/s) | 71.5 | 73.3 | 75.1 | 77 | 78.8 | 80.6 | 82.5 | 84.3 |
| Second Stage Pitch Line Velocity (m/s) | 84.4 | 84.4 | 84.4 | 84.4 | 84.4 | 84.4 | 84.4 | 84.4 |
| INPUT shaft Diameter | 173.3 | 181.9 | 190.4 | 198.6 | 206.7 | 214.6 | 222.3 | 229.9 |
| Number of Layshafts | 6 | 6 | 6 | 7 | 7 | 7 | 8 | 8 |

In the specific examples detailed in Tables 1 and 2, the input shaft 304 can drive the sun gear 310 having a pitch diameter ($PD_{Sun}$) of between 160 and 230 mm, such as 160 mm, 165 mm, 170 mm, 175 mm, 180 mm, 185 mm, 190 mm, 195 mm, 200 mm, 205 mm, 210 mm, 215 mm, 220 mm, 225 mm, 230 mm, or any diameter in between, and which rotates at 7000 RPM along with the input shaft. The sun gear 310 engages with the first stage gear 316 of the plurality of planet gears 312, each having a first stage pitch diameter ($PD_1$) of between 121.9 and 113.7 mm, such as 121.9 mm, 122.1 mm, 112.0 mm, 121.7 mm, 121.4 mm, 120.9 mm, 120.3 mm, 119.7 mm, 118.9 mm, 118.0 mm, 117.1 mm, 116.0 mm, 114.9 mm, 113.7 mm, or any diameter in between, and drives the planet gears 312 at a layshaft speed ranging between 9184 and 14166 RPM, such as 9184 RPM, 9461 RPM, 9747 RPM, 10044 RPM, 10351 RPM, 10670 RPM, 11000 RPM, 11343 RPM, 11699 RPM, 12070 RPM, 112455 RPM, 12856 RPM, 13274 RPM, 13710 RPM, 14166 RPM, or any layshaft speed in between. The corresponding gear ratios ($GR_1$) between the sun gear 310 and the first stage gear 316 of the plurality of planet gears 312 can range from 0.76 to 0.49, such as 0.76, 0.74, 0.72, 0.70, 0.68, 0.66, 0.64, 0.62, 0.60, 0.58. 0.56, 0.54. 0.53, 0.51, 0.49, or any gear ratio in between. The first stage gear 316 of the planet gears 312 can have a pitch line velocity ranging from 58.6 to 84.3 m/s, such as 58.6 m/s, 60.5 m/s, 62.3 m/s, 64.1 m/s, 66.0 m/s, 67.8 m/s, 69.6 m/s, 71.5 m/s, 73.3 m/s, 75.1 m/s, 77.0 m/s, 78.8 m/s, 80.6 m/s, 82.5 m/s, 84.3 m/s, or any pitch line velocity in between.

In the specific examples detailed in Tables 1 and 2, the second stage gear 318 of each of the planet gears 312 rotates along with the corresponding first stage gear 316 of each planet gear 312. The second stage gear 318 of the planet gears 312 can have a second stage pitch diameter ($PD_2$) greater than the first stage pitch diameter ($PD_1$) and between 175.5 and 113.8 mm, such as 175.5 mm, 170.4 mm, 165.3 mm, 160.5 mm, 155.7 mm, 151.1 mm, 146.5 mm, 142.1 mm, 137.8 mm, 133.5 mm, 129.4 mm, 125.4 mm, 121.4 mm, 117.6 mm, 113.8 mm, or any diameter in between, and can rotate at a layshaft speed ranging between 9184 and 14166 RPM, such as 9184 RPM, 9461 RPM, 9747 RPM, 10044 RPM, 10351 RPM, 10670 RPM, 11000 RPM, 11343 RPM, 11699 RPM, 12070 RPM, 112455 RPM, 12856 RPM, 13274 RPM, 13710 RPM, 14166 RPM, or any layshaft speed in between.

In the specific examples detailed in Tables 1 and 2, the second stage gear 318 of each of the planet gears 312 engages with the ring gear 314, which can have a ring gear pitch diameter ($PD_{Ring}$) of 457.43 mm. The corresponding gear ratios between the second stage gear 318 of each of the planet gears 312 and the ring gear ($GR_2$) can range from 2.61 to 4.02, such as 2.61, 2.69, 2.77, 2.85, 2.94, 3.03, 3.12, 3.22, 3.32, 3.43, 3.53, 3.65, 3.77, 3.89, 4.02, or any gear ratio in between and, multiplied by $GR_1$, can result in the gear assembly 302 having the desired total gear ratio ($GR_{Total}$) of 1.987. In these examples the second stage gear 318 of each planet gear 312 can have a pitch line velocity of 84.4 m/s.

As detailed in Tables 1 and 2, lower gear ratios between the second stage gear 318 of the planet gears 312 and the ring gear 314 ($GR_2$) correspond to planet gears having larger first stage gears 316 and second stage gears 318, as indicated by the correspondingly larger pitch diameters of the first and second stages ($PD_1$, $PD_2$). As previously discussed, larger planet gears 312 offer several advantages, such as the ability to accommodate larger and more stable cylindrical bearings 328. Additionally, as indicated in Table 1, when larger planet gears are used, it becomes possible to use fewer planet gears 312, which in turn reduces the part count of the gear assembly. Furthermore, the pitch line velocity (i.e., the linear velocity of the gear teeth along the pitch line/pitch diameter) between the sun gear 310 and the first stage gear 316 of the planet gear 312 is lower when larger gears can be used. Pitch line velocity governs the speed and force at which the teeth of the various gears of the gear assembly engage with each other. A higher pitch line velocity, as previously discussed, can result in faster wear of the gear teeth, as engagement occurs at higher speed and force. Accordingly, a lower pitch line velocity can improve gear assembly efficiency and reduce engine maintenance costs.

Gear assemblies according to the examples disclosed above offer the ability to achieve lower gear ratios with more robust gear assembly designs and/or in a smaller radial envelope when compared to a conventional epicyclic gear assembly. Such gear assemblies may also have lower part count, longer part lifetime, and greater efficiencies when compared to a conventional epicyclic gear assembly.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

An epicyclic gear assembly, comprising an input shaft, an output shaft, a sun gear connected to the input shaft and having a sun gear pitch diameter, a plurality of planet gears disposed radially outward from the sun gear having a first stage with a first stage pitch diameter and a second stage with a second stage pitch diameter, and a ring gear having a ring gear pitch diameter disposed radially outwards of the plurality of planet gears, connected to the output shaft and configured to drive the output shaft; wherein the sun gear is configured to be driven by an input shaft and is engaged with the first stage of the plurality of planet gears, wherein the second stages of the plurality of planet gears are engaged with the ring gear, and wherein the sun gear pitch diameter is greater than the first stage pitch diameter and second stage pitch diameter is greater than the first stage pitch diameter, such that the first stage of the planet gear is a multiplicator gear and the second stage of the planet gear is a reductor gear.

The epicyclic gear assembly of any preceding clause, wherein a total gear ratio between the sun gear and the ring gear is less than 3.5.

The epicyclic gear assembly of any preceding clause, wherein a total gear ratio between the sun gear and the ring gear is less than 2.3.

The epicyclic gear assembly of any preceding clause, wherein the plurality of planet gears comprises 6 or fewer compound planet gears.

The epicyclic gear assembly of any preceding clause, wherein a ratio between the first stage pitch diameter and the second stage pitch diameter is less than 0.9.

The epicyclic gear assembly of any preceding clause, wherein the first stage of the plurality of planet gears and the second stage of the plurality of planet gears is integrally formed.

The epicyclic gear assembly of any preceding clause, wherein any of the sun gear, the planet gears, or the ring gear are helical gears.

The epicyclic gear assembly of any preceding clause, wherein the first stage and the second stage of the planet gears together form a plurality of integral layshafts.

The epicyclic gear assembly of any preceding clause, wherein the second stage of the planet gears comprises a first second stage gear and a second second stage gear, and wherein each integral layshaft comprises a first stage gear disposed between the first second stage gear and the second second stage gear.

The epicyclic gear assembly of any preceding clause, wherein the output shaft is configured to drive a fan assembly.

The epicyclic gear assembly of any preceding clause, wherein a gear ratio between the sun gear and the first stage of the planet gears is less than 1 and a gear ratio between the second stage of the of the planet gears and the ring gear is greater than a total gear ratio between the sun gear and the ring gear.

The epicyclic gear assembly of any preceding clause, wherein the second stage of the planet gears has a second stage pitch diameter and wherein the second stage pitch diameter is greater than the first stage pitch diameter.

The epicyclic gear assembly of any preceding clause wherein the planet gears are contained in a planet gear carrier, and the planet gear carrier is attached to a fixed engine housing.

A turbomachine engine comprising an input shaft, an output shaft, an epicyclic gear assembly comprising a drive gear, a first stage gear, a second stage gear, and an output gear; wherein the drive gear is attached to the input shaft and engaged with the first stage gear, wherein the reduction gear and the first stage gear are coaxial and configured to rotate together, wherein the reduction gear is engaged with the output gear, and wherein the output gear is attached to the output shaft.

The turbomachine engine of any preceding clause, wherein the first stage gear and the second stage gear are integrally formed as part of a planet gear layshaft and wherein the planet gear layshaft comprises the first stage gear, the second stage gear, a layshaft pin extending axially through the first stage gear and the second stage gear, and a plurality of roller bearings disposed between the layshaft pin and the second stage gear.

The turbomachine engine of any preceding clause, wherein the first stage gear has a first pitch diameter and the second stage gear has a second pitch diameter and wherein the second pitch diameter is greater than the first pitch diameter.

The turbomachine engine of any preceding clause, wherein the drive gear is a sun gear, the output gear is a ring gear, and the drive gear and output gear are coaxial.

The turbomachine engine of any preceding clause, wherein the first stage gear and the second stage gear are disposed radially between the drive gear and the first stage gear.

The turbomachine engine of any preceding clause, wherein a total gear ratio between the drive gear and the output gear is less than 3.5.

An aircraft comprising a turbofan engine having a core engine output shaft, a gear assembly, and an output shaft configured to drive a first fan assembly, wherein the gear assembly comprises a sun gear connected to the core engine output shaft and having a sun gear pitch diameter, a plurality of planet gears disposed radially outward from the sun gear having a first stage with a first stage pitch diameter and a second stage with a second stage pitch diameter, and a ring gear having a ring gear pitch diameter disposed radially outwards of the plurality of planet gears, connected to the output shaft and configured to drive the output shaft; wherein the sun gear is configured to be driven by an input shaft and is engaged with the first stage of the plurality of planet gears, wherein the second stages of the plurality of planet gears are engaged with the ring gear, wherein the sun gear pitch diameter is greater than the first stage pitch diameter and second stage pitch diameter is greater than the first stage pitch diameter, such that the first stage is a multiplicator gear and the second stage is a reductor gear.

The aircraft of any preceding clause, wherein a total gear ratio between the sun gear and the ring gear is less than 3.5.

The aircraft of any preceding clause, wherein a total gear ratio between the sun gear and the ring gear is less than 2.3.

The aircraft of any preceding clause, wherein the plurality of compound planet gears comprises 6 or fewer compound planet gears.

The aircraft of any preceding clause, wherein a ratio between a pitch diameter of the first stage of the plurality of compound planet gears and a pitch diameter of the second stage of the plurality of compound planet gears is less than 0.9.

The aircraft of any preceding clause, wherein the first stage of the plurality of compound planet gears and the second stage of the plurality of compound planet gears is integrally formed.

The aircraft of any preceding clause, wherein any of the sun gear, the compound planet gears, or the ring gear are helical gears.

The aircraft of any preceding clause, wherein the first stage and the second stage of the compound planet gears together form a plurality of integral layshafts.

The aircraft of any preceding clause, wherein the second stages of the compound planet gears comprise a first second stage gear and a second second stage gear, and wherein each integral layshaft comprises a first stage gear disposed between the first second stage gear and the second second stage gear.

The aircraft of any preceding clause, wherein the output shaft is configured to drive a fan assembly.

The aircraft of any preceding clause, wherein a gear ratio between the sun gear and the first stage of the compound planet gears is less than 1 and a gear ratio between the second stage of the of the compound planet gears and the ring gear is greater than a total gear ratio between the sun gear and the ring gear.

The aircraft of any preceding clause, wherein the second stage of the compound planet gears has a second stage pitch diameter and wherein the second stage pitch diameter is greater than the first stage pitch diameter.

The aircraft of any preceding clause, wherein the compound planet gears are contained in a planet gear carrier, and the planet gear carrier is attached to a fixed engine housing.

In view of the many possible embodiments to which the principles of the disclosed disclosure may be applied, it should be recognized that the illustrated embodiments are only preferred examples of the disclosure and should not be taken as limiting the scope of the disclosure. Rather, the scope of the disclosure is defined by the following claims.

The invention claimed is:
1. An epicyclic gear assembly, comprising:
an input shaft;
an output shaft;
a sun gear connected to the input shaft and having a sun gear pitch diameter;
a plurality of compound planet gears disposed radially outward from the sun gear, each compound planet gear of the plurality of compound planet gears comprising a first stage with a first stage pitch diameter and a second stage with a second stage pitch diameter; and
a ring gear having a ring gear pitch diameter disposed radially outwards of the plurality of compound planet gears, connected to the output shaft and configured to drive the output shaft;
wherein the sun gear is configured to be driven by the input shaft and is engaged with the first stage of the plurality of compound planet gears;
wherein the second stage of each compound planet gear is engaged with the ring gear;
wherein the sun gear pitch diameter is greater than the first stage pitch diameter and second stage pitch diameter is greater than the first stage pitch diameter, such that the first stage of the compound planet gear is a multiplicator gear and the second stage of the compound planet gear is a reductor gear, wherein the first stage and the second stage of the compound planet gears together form a plurality of integral layshafts, and wherein the second stages of the compound planet gears comprise a first second stage gear and a second stage gear, and wherein each integral layshaft comprises a first stage gear disposed between the first second stage gear and the second stage gear.

2. The epicyclic gear assembly of claim 1, wherein a total gear ratio between the sun gear and the ring gear is less than 3.5.

3. The epicyclic gear assembly of claim 1, wherein a total gear ratio between the sun gear and the ring gear is less than 2.3.

4. The epicyclic gear assembly of claim 1, wherein the plurality of compound planet gears comprises 6 or fewer compound planet gears.

5. The epicyclic gear assembly of claim 1, wherein a ratio between a pitch diameter of the first stage of the plurality of compound planet gears and a pitch diameter of the second stage of the plurality of compound planet gears is less than 0.9.

6. The epicyclic gear assembly of claim 1, wherein the first stage of the plurality of compound planet gears and the second stage of the plurality of compound planet gears is integrally formed.

7. The epicyclic gear assembly of claim 1, wherein any of the sun gear, the compound planet gears, or the ring gear are helical gears.

8. The epicyclic gear assembly of claim 1, wherein the output shaft is configured to drive a fan assembly.

9. The epicyclic gear assembly of claim 1, wherein a gear ratio between the sun gear and the first stage of the compound planet gears is less than 1 and a gear ratio between the second stage of the of the compound planet gears and the ring gear is greater than a total gear ratio between the sun gear and the ring gear.

10. The epicyclic gear assembly of claim 1, wherein the second stage of the compound planet gears has a second stage pitch diameter and wherein the second stage pitch diameter is greater than the first stage pitch diameter.

11. The epicyclic gear assembly of claim 1, wherein the compound planet gears are contained in a planet gear carrier, and the planet gear carrier is attached to a fixed engine housing.

12. An epicyclic gear assembly comprising:
an input shaft;
an output shaft;
a drive gear;
a plurality of compound planet gears;
an output gear;
wherein the drive gear is attached to the input shaft and engaged with the plurality of compound planet gears;
wherein the output gear is attached to the output shaft,
wherein each of the plurality of compound planet gears comprise a first stage and a second stage on an integral layshaft; and
wherein the second stages of the compound planet gears comprise a first second stage gear and a second stage gear, and wherein each integral layshaft comprises a first stage gear disposed between the first second stage gear and the second stage gear.

13. The epicyclic gear assembly of claim 12, wherein the first stage of the compound planet gears has a first pitch diameter and the second stage of the compound planet gears has a second pitch diameter and wherein the second pitch diameter is greater than the first pitch diameter.

14. The epicyclic gear assembly of claim 12, wherein a total gear ratio between the drive gear and the output gear is less than 3.5.

* * * * *